United States Patent
Wang et al.

(10) Patent No.: US 9,951,276 B2
(45) Date of Patent: Apr. 24, 2018

(54) LIQUID CRYSTAL COMPOSITION AND DISPLAY DEVICE THEREOF

(71) Applicant: JIANGSU HECHENG DISPLAY TECHNOLOGY CO., LTD., Jiangsu (CN)

(72) Inventors: Panpan Wang, Jiangsu (CN); Wenming Han, Jiangsu (CN); Wenyang Ma, Jiangsu (CN); Wenqi Zhang, Jiangsu (CN)

(73) Assignee: JIANGSU HECHENG DISPLAY TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/504,324

(22) PCT Filed: Oct. 12, 2015

(86) PCT No.: PCT/CN2015/091756
§ 371 (c)(1),
(2) Date: Feb. 16, 2017

(87) PCT Pub. No.: WO2016/062209
PCT Pub. Date: Apr. 28, 2016

(65) Prior Publication Data
US 2017/0233654 A1    Aug. 17, 2017

(30) Foreign Application Priority Data
Oct. 20, 2014 (CN) .......................... 2014 1 0560204

(51) Int. Cl.
 G02F 1/1333 (2006.01)
 C09K 19/34 (2006.01)
 C09K 19/32 (2006.01)
(52) U.S. Cl.
 CPC .......... C09K 19/3405 (2013.01); C09K 19/32 (2013.01); C09K 19/3402 (2013.01); C09K 2019/3422 (2013.01)
(58) Field of Classification Search
 CPC ............... C09K 19/3405; C09K 19/32; C09K 19/3402; C09K 2019/3422; G02F 1/1333
 USPC .................. 252/299.01, 299.66; 428/1.1
 See application file for complete search history.

(56) References Cited

U.S. PATENT DOCUMENTS

| 7,390,538 B2 * | 6/2008 | Manabe | C09K 19/12 |
| | | | 252/299.63 |
| 9,193,909 B2 * | 11/2015 | Wu | C09K 19/32 |

FOREIGN PATENT DOCUMENTS

| CN | 1178550 | 4/1998 |
| CN | 1823151 | 8/2006 |
| CN | 104593002 | 5/2015 |
| DE | 19528106 | 8/1996 |
| DE | 19509410 | 9/1996 |
| DE | 19528107 | 9/1996 |
| EP | 0667555 | 8/1995 |
| EP | 0673986 | 9/1995 |
| WO | 9623851 | 8/1996 |
| WO | 9628521 | 9/1996 |
| WO | 2009100810 | 8/2009 |

OTHER PUBLICATIONS

"International Search Report (Form PCT/ISA/210)", dated Jan. 5, 2016, with English translation hereof, pp. 1-4.

* cited by examiner

*Primary Examiner* — Geraldina Visconti
(74) *Attorney, Agent, or Firm* — JCIPRNET

(57) ABSTRACT

The present invention discloses a liquid crystal composition and a display device containing the same. The liquid crystal composition comprises one or more compounds of general Formula I; one or more compounds of general Formula II; and one or more compounds of general Formula III. The liquid crystal composition provided in the present invention has the properties of large optical and dielectric anisotropies, high clearing point, fast response speed, high resistivity, and good high-temperature and UV stability, and is applicable to a liquid crystal display (LCD), and particularly an LCD display requiring fast response speed, such that a good display effect of images without ghosting can be achieved when the LCD display works in a harsh environment.

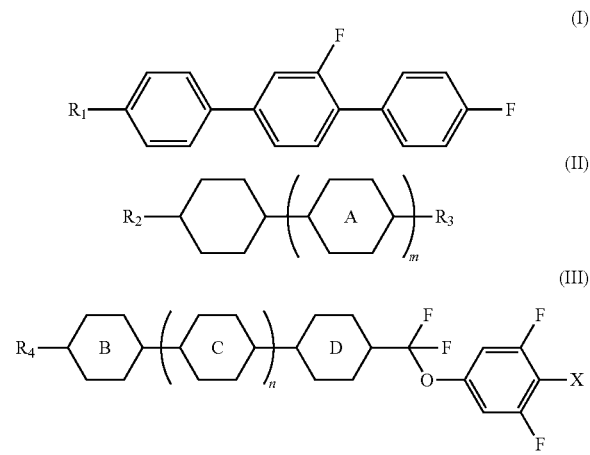

11 Claims, No Drawings

LIQUID CRYSTAL COMPOSITION AND DISPLAY DEVICE THEREOF

CROSS-REFERENCE TO RELATED APPLICATION

This application is a 371 application of an International PCT application serial no. PCT/CN2015/091756, filed on Oct. 12, 2015, which claims the priority benefits of China Application No. 201410560204.0, filed on Oct. 20, 2014. The entirety of each of the above-mentioned patent applications is hereby incorporated by reference herein and made a part of this specification.

BACKGROUND OF THE INVENTION

Field of the Invention

The present invention relates to a liquid crystal composition, and particularly to a liquid crystal composition having large optical and dielectric anisotropies, high clearing point, fast response speed, high resistivity, good high-temperature and UV stability, and to a liquid crystal display (LCD) comprising the liquid crystal composition.

Description of Related Art

The liquid crystal material is a mixture of organic rod-like small molecule compounds having both fluidity and anisotropic properties of liquid crystals at a certain temperature. Liquid crystal materials are primarily used as dielectrics in displays because the optical properties of such materials can be varied by the applied voltage. Liquid crystal displays (LCDs) are displays making use of photoelectric changes, and have become the most popular flat panel displays in recent years, because of their small size, light weight, low power consumption, excellent display quality, and other attractive advantages. The electro-optical modes employed in existing LCD displays include, for example, twisted nematic (TN) mode, supertwisted nematic (STN) mode, optical compensated bend (OCB) mode, electronically controlled birefringence (ECB) mode, and variations thereof. In all of these modes, an electric field that is substantially perpendicular to the substrate or perpendicular to the liquid crystal layer is used. In addition to these modes, there is also an electro-optical mode employing an electric field that is substantially parallel to the substrate or the liquid crystal layer, such as, in-plane switching (IPS) mode.

For such displays, new liquid crystal media with improved performance are desired. Particularly, for many types of application, a liquid crystal medium comprising a liquid crystal composition needs to have a nematic phase over a suitable wide range of temperature, an appropriate birefringence, and a dielectric anisotropy that is high enough to allow a reasonably low operating voltage. Materials for liquid crystal display further need to have a nematic phase over a suitable wide range of temperature, high-temperature stability, and other properties, to meet the requirement for good display effect in various environments.

The liquid crystal compositions suitable for use in LCD and particularly TFT displays are known, for example, from JP07-181439, EP0667555, EP0673986, DE19509410, DE19528106, DE19528107, WO9623851 and WO9628521. However, these liquid crystal compositions suffer from notorious disadvantages. They mostly cause an adversely long response time, have a low resistivity, and need an excessively high operating voltage, among others.

Therefore, in the field of liquid crystal materials, there is particularly a need for a liquid crystal composition having properties needed in practical use, for example, high upper temperature of a nematic phase, appropriate optical anisotropy, good dielectric anisotropy, high-temperature stability, and high resistivity.

SUMMARY OF THE INVENTION

An objective of the present invention is to provide a liquid crystal composition having large optical and dielectric anisotropies, high clearing point, fast response speed, high resistivity, good high-temperature and UV stability. The liquid crystal composition is applicable to a liquid crystal display (LCD), and particularly an LCD display requiring fast response speed, such that a good display effect of images without ghosting can be achieved when the LCD display works in a harsh environment.

The following technical solutions are employed in the present invention.

A liquid crystal composition is provided, which comprises:

one or more compounds of general Formula I:

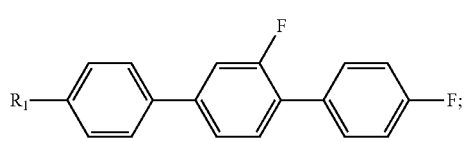

one or more compounds of general Formula II:

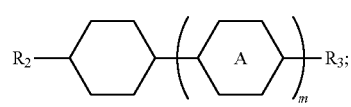

and one or more compounds of general Formula III:

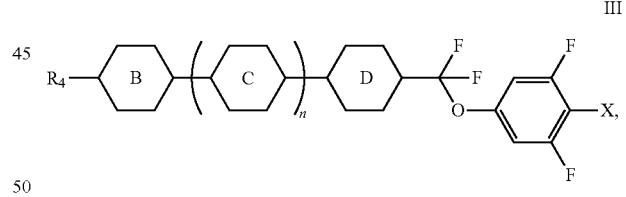

wherein:

$R_1$, $R_2$, $R_3$ and $R_4$ are the same or different, and each independently denotes H, a linear alkyl or alkoxy group having 1 to 7 carbon atoms, or an alkenyl group having 2 to 7 carbon atoms;

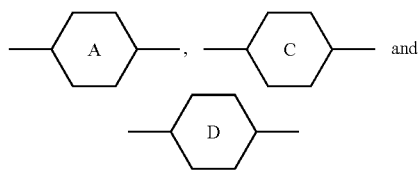

are the same or different, and each independently denotes

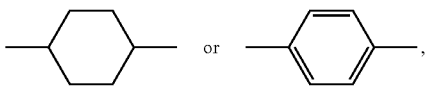

where one or more H atoms on the

may be replaced by F;

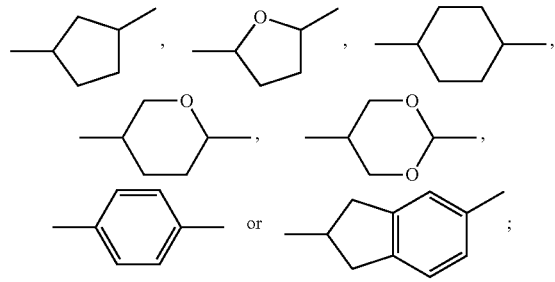

denotes

X denotes F or —OCF$_2$CF=CF$_2$;

m denotes 1, 2 or 3; and n denotes 0 or 1.

In an embodiment of the present invention, the compound of general Formula I accounts for 5-30% of the total weight of the liquid crystal composition; the compound of general Formula II accounts for 30-70% of the total weight of the liquid crystal composition; and the compound of general Formula III accounts for 15-40% of the total weight of the liquid crystal composition.

In an embodiment of the present invention, the compound of general Formula I is preferably one or more selected from the group consisting of:

I-1
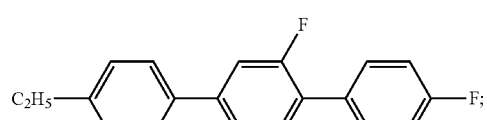

I-2
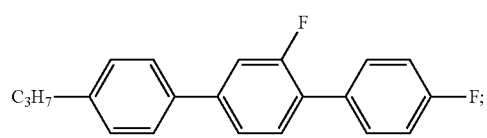

I-3
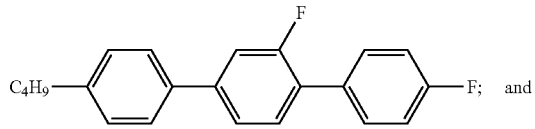

and

I-4
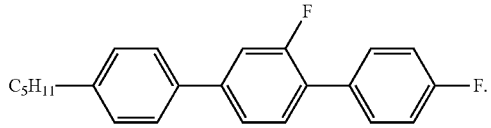

In an embodiment of the present invention, the compound of general Formula II is preferably one or more selected from the group consisting of:

II-1
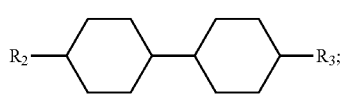

II-2
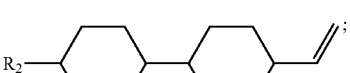

II-3
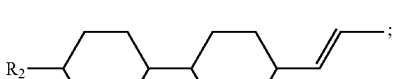

II-4
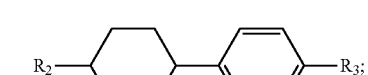

II-5
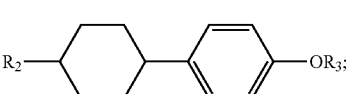

II-6
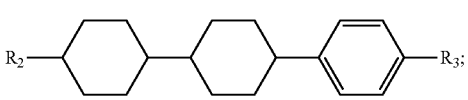

II-7
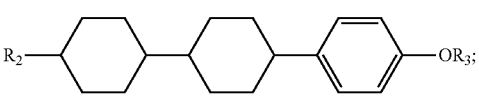

II-8
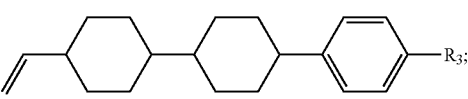

II-9

II-10
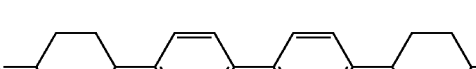

II-11

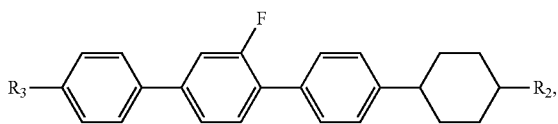

wherein:

R$_2$ and R$_3$ are the same or different, and each independently denotes a linear alkyl group having 1 to 5 carbon atoms.

As a particularly preferred solution, the compound of general Formula II-1 is particularly preferably one or more selected from the group consisting of:

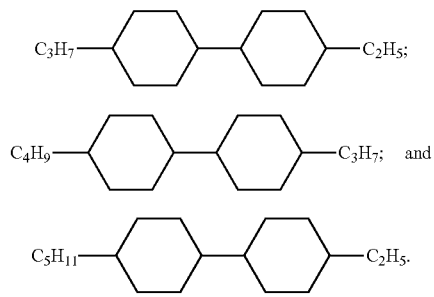

As a particularly preferred solution, the compound of general Formula II-2 is particularly preferably one or more selected from the group consisting of:

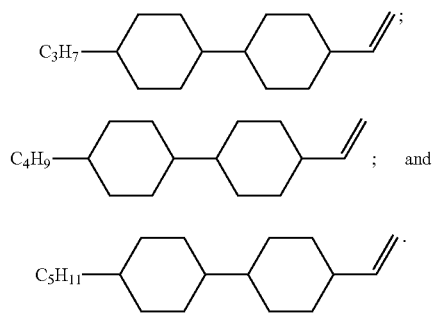

As a particularly preferred solution, the compound of general Formula II-3 is particularly preferably one or more selected from the group consisting of:

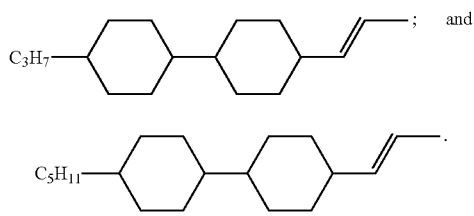

As a particularly preferred solution, the compound of general Formula II-4 is particularly preferably one or more selected from the group consisting of:

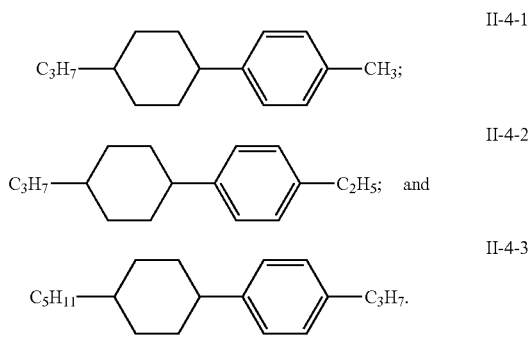

As a particularly preferred solution, the compound of general Formula II-5 is particularly preferably one or more selected from the group consisting of:

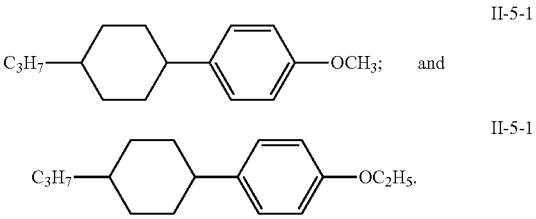

As a particularly preferred solution, the compound of general Formula II-6 is particularly preferably one or more selected from the group consisting of:

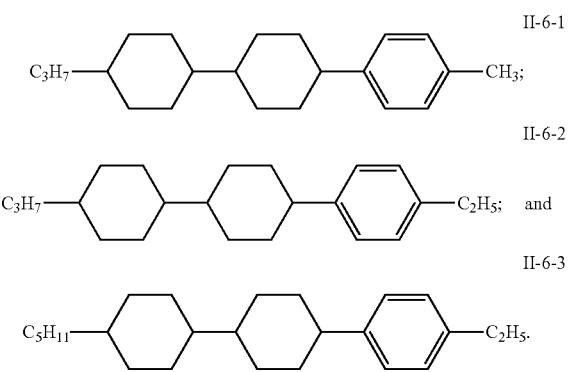

As a particularly preferred solution, the compound of general Formula II-7 is particularly preferably one or more selected from the group consisting of:

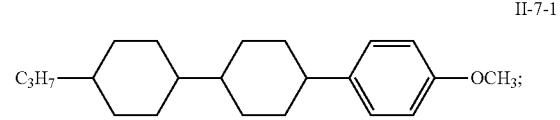

-continued

II-7-2
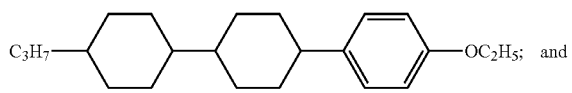

II-7-3

As a particularly preferred solution, the compound of general Formula II-8 is particularly preferably one or more selected from the group consisting of:

II-8-1
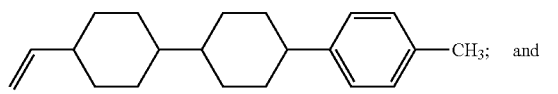

II-8-2

As a particularly preferred solution, the compound of general Formula II-9 is particularly preferably one or more selected from the group consisting of:

II-9-1

II-9-2

II-9-3
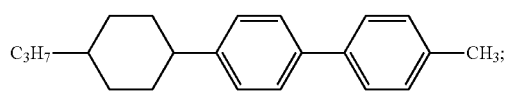

As a particularly preferred solution, the compound of general Formula II-10 is particularly preferably one or more selected from the group consisting of:

II-10-1

II-10-2

II-10-3
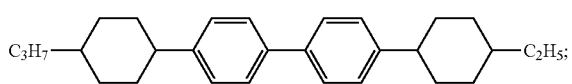
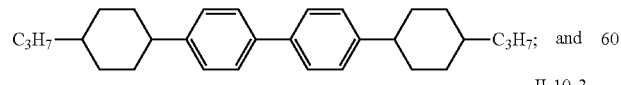
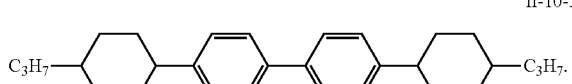

As a particularly preferred solution, the compound of general Formula II-11 is particularly preferably one or more selected from the group consisting of:

II-11-1

II-11-2
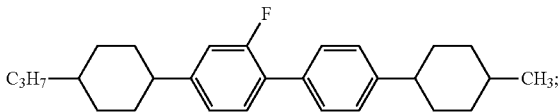

II-11-3

II-11-4
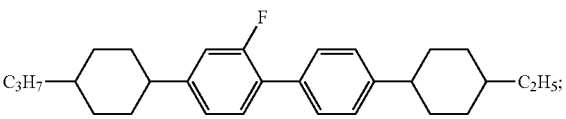

As a particularly preferred solution, the compound of general Formula II-12 is particularly preferably one or more selected from the group consisting of:

II-12-1

II-12-2
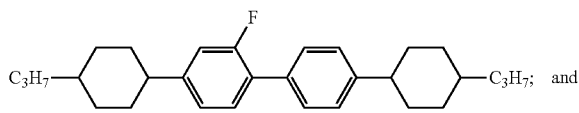

II-12-3
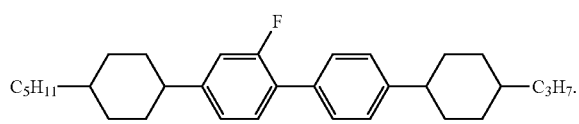

In an embodiment of the present invention, the compound of general Formula III is preferably one or more selected from the group consisting of:

III-1
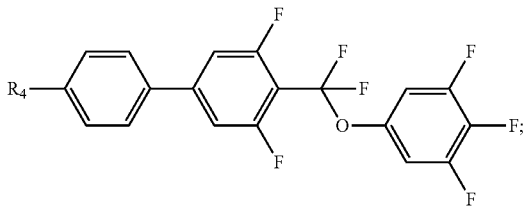

III-2
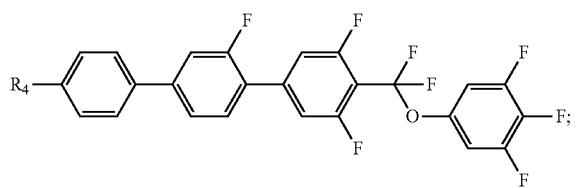
III-3
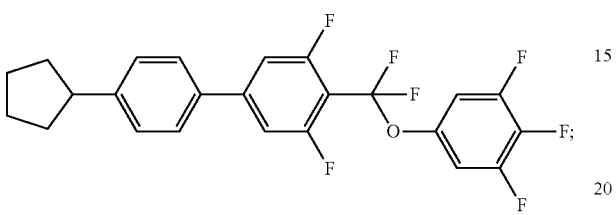
III-4
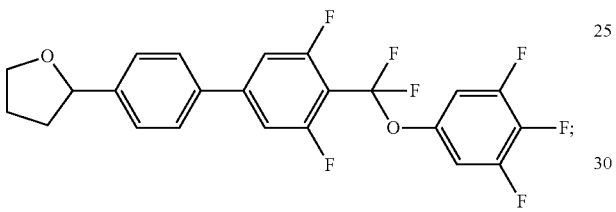
III-5
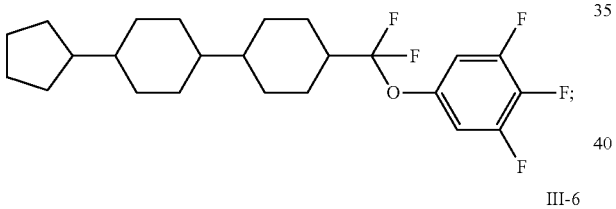
III-6
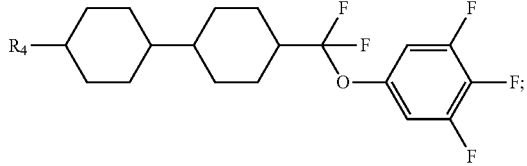
III-7
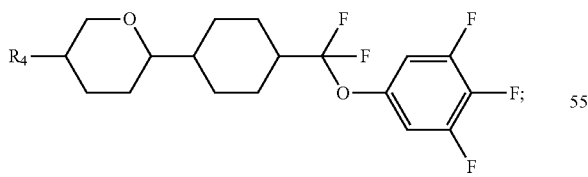
III-8
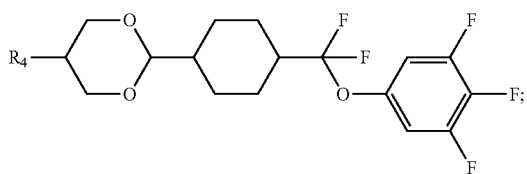
III-9
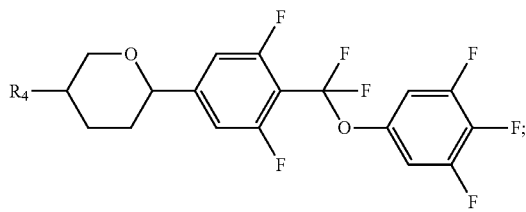
III-10
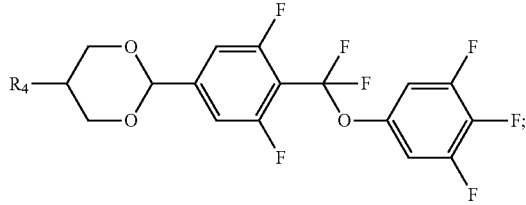
III-11
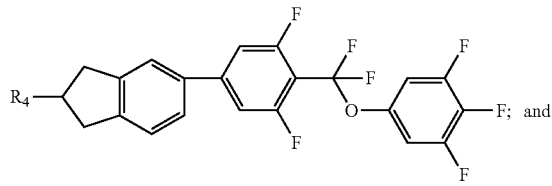
III-12
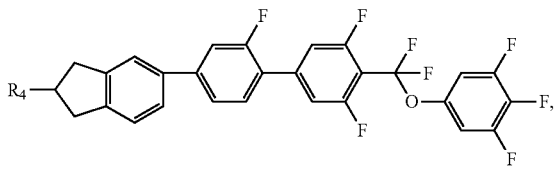
wherein:
$R_4$ denotes a linear alkyl group having 1 to 5 carbon atoms.
As a particularly preferred solution, the compound of general Formula III-1 is particularly preferably one or more selected from the group consisting of:
III-1-1
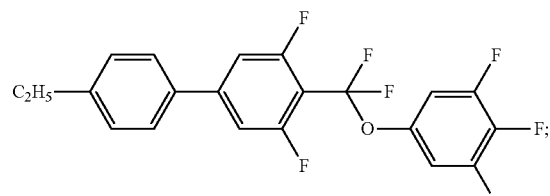
III-1-2
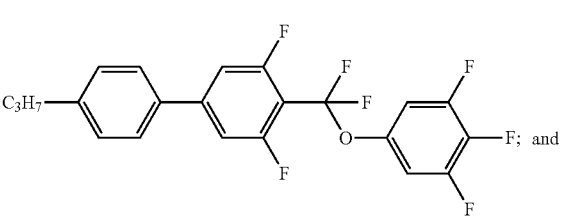

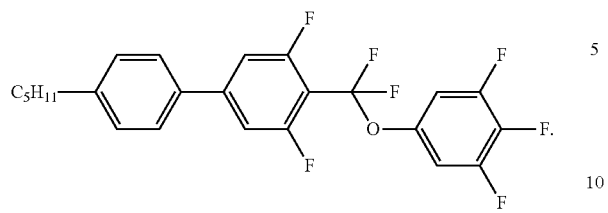

III-1-3

As a particularly preferred solution, the compound of general Formula III-2 is particularly preferably one or more selected from the group consisting of:

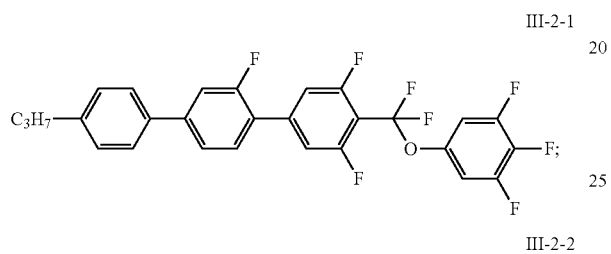

III-2-1

III-2-2

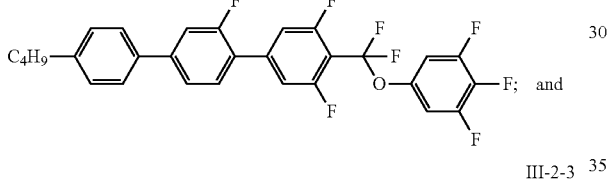

III-2-3

As a particularly preferred solution, the compound of general Formula III-6 is particularly preferably one or more selected from the group consisting of:

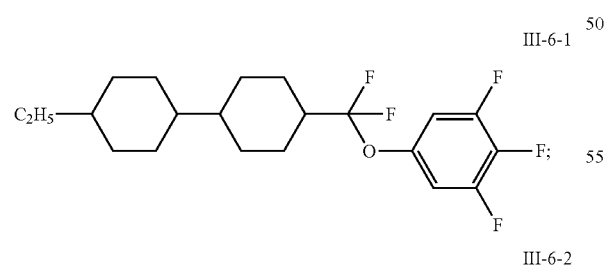

III-6-1

III-6-2

III-6-3

As a particularly preferred solution, the compound of general Formula III-7 is particularly preferably one or more selected from the group consisting of:

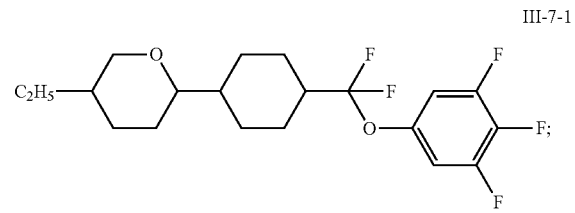

III-7-1

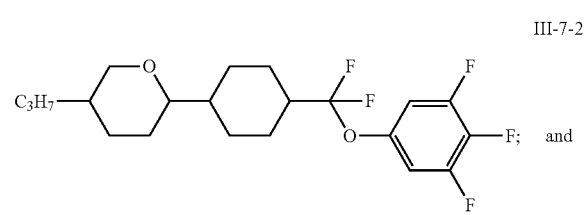

III-7-2

III-7-3

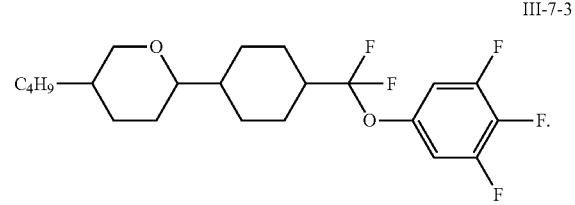

As a particularly preferred solution, the compound of general Formula III-8 is particularly preferably one or more selected from the group consisting of:

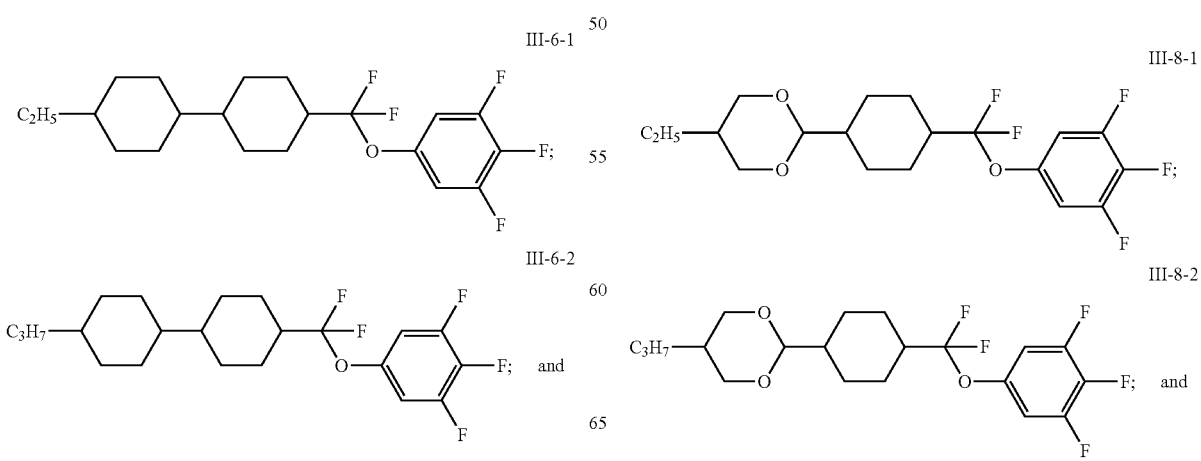

III-8-1

III-8-2

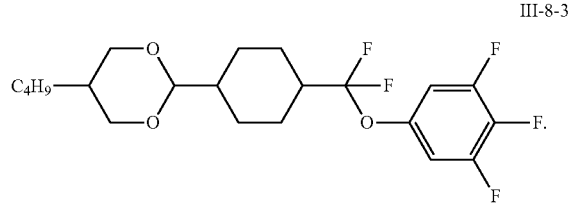

III-8-3

As a particularly preferred solution, the compound of general Formula III-9 is particularly preferably one or more selected from the group consisting of:

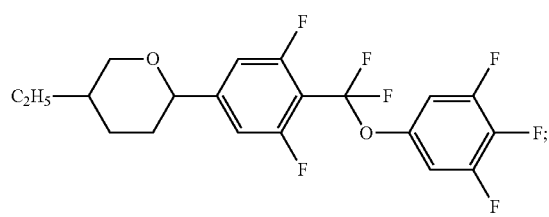

III-9-1

III-9-2

III-9-3

As a particularly preferred solution, the compound of general Formula III-10 is particularly preferably one or more selected from the group consisting of:

III-10-1

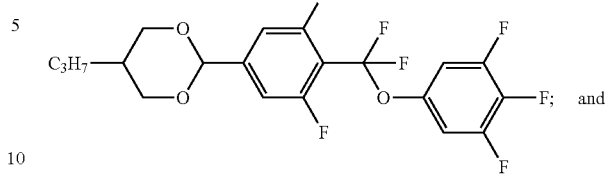

III-10-2

III-10-3

As a particularly preferred solution, the compound of general Formula III-11 is particularly preferably one or more selected from the group consisting of:

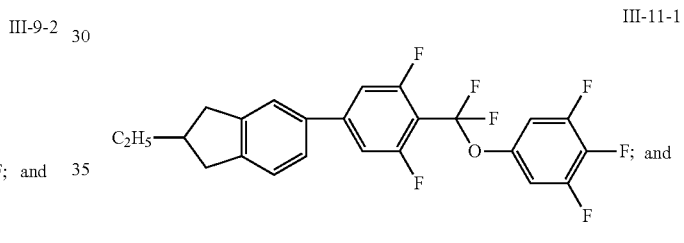

III-11-1

III-11-2

As a particularly preferred solution, the compound of general Formula III-12 is particularly preferably one or more selected from the group consisting of:

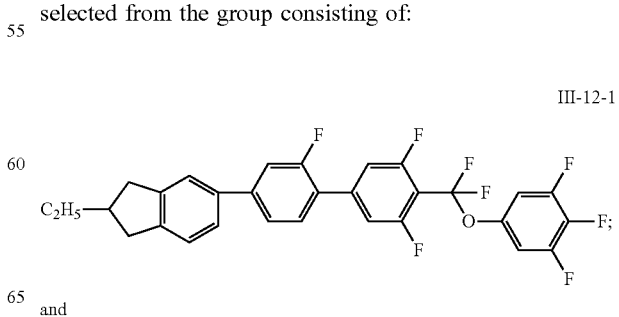

III-12-1 and

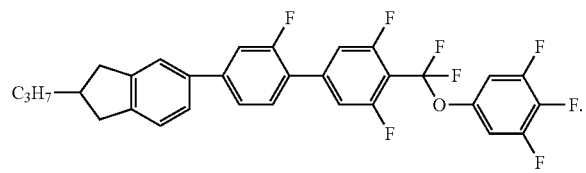
III-12-2

The liquid crystal composition of the present invention further comprises one or more compounds of general Formula IV that account for 1-30% of the liquid crystal composition:

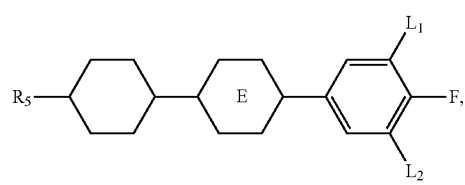
IV wherein:
$R_5$ denotes a linear alkyl or alkoxy group having 1 to 7 carbon atoms;

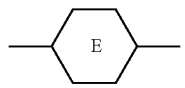

denotes

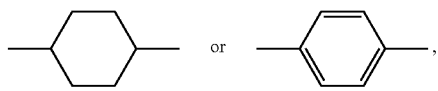

wherein one or more H atoms on the

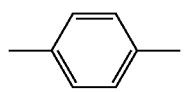

may be replaced by F; and
$L_1$ and $L_2$ are the same or different, and each independently denotes H or F.

In an embodiment of the present invention, the compound of general Formula IV is preferably one or more selected from the group consisting of:

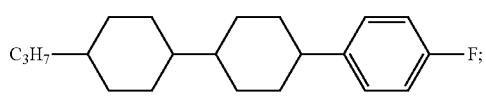
IV-1

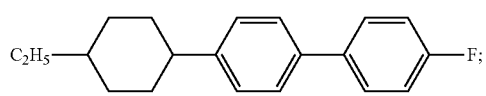
IV-2

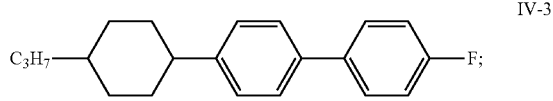
IV-3

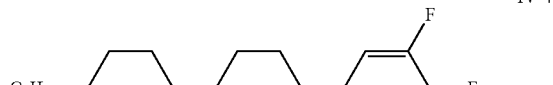
IV-4

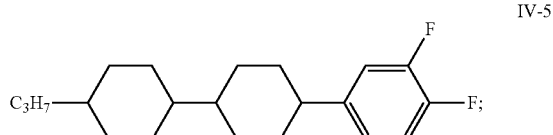
IV-5

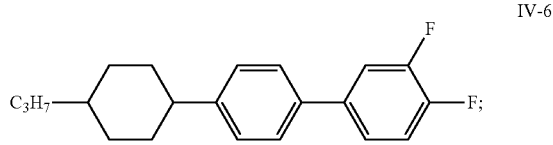
IV-6

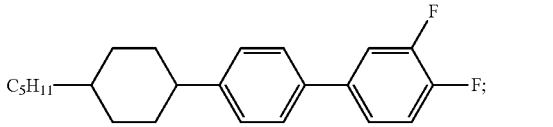
IV-7

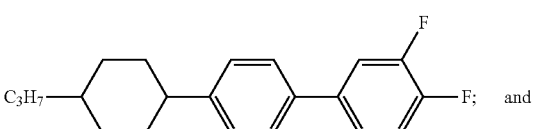
IV-8 and

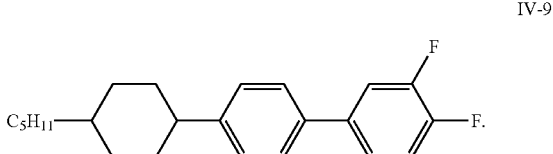
IV-9

As a particularly preferred solution, the compounds IV-1, IV-3, IV-5, IV-6, IV-8, and IV-9 are particularly preferred.

As a particularly preferred solution, in the liquid crystal composition provided in the present invention, the compound of general Formula I accounts for 5-15% of the total weight of the liquid crystal composition; the compound of general Formula II accounts for 40-60% of the total weight of the liquid crystal composition; the compound of general Formula III accounts for 20-25% of the total weight of the liquid crystal composition; and the compound of general Formula IV accounts for 5-20% of the total weight of the liquid crystal composition.

The present invention further provides an LCD comprising the liquid crystal composition of the present invention.

Beneficial effect: the following technical advancements advantageous over the prior art are achieved in the present invention by employing the technical solutions above.

The liquid crystal composition of the present invention has the properties of large optical and dielectric anisotropies, high clearing point, fast response speed, high resistivity, and good high-temperature and UV stability, and is applicable to a LCD, whereby the LCD is enabled to have a fast response speed, and a good display effect of images without ghosting can be achieved when the LCD works in a harsh environment.

Unless specifically stated otherwise, in the present invention, the ratio is weight ratio, the temperature is in degrees Celsius, and the response time data is tested with a cell gap of 7 μm.

DETAILED DESCRIPTION OF THE INVENTION

Hereinafter, the present invention is described with reference to specific embodiments. It should be noted that the examples below are illustrative of the present invention, and are provided merely for explaining, instead of limiting the present invention. Other combinations and various improvements may be made within the concept and without departing from the spirit and scope of the present invention.

For ease of description, in the following examples, the group structures contained in the liquid crystal compound are denoted by the codes listed in Table 1:

TABLE 1

Codes for group structures contained in the liquid crystal compound

| Unit structure of the group | Code | Name of the group |
|---|---|---|
|  | C(5) | Cyclopentane |
|  | D(5) | 2-tetrahydrofuran |
|  | C | 1,4-cyclohexylene |
|  | A | Oxane |
|  | D | Dioxane |
|  | P | 1,4-phenylene |
|  | G | 2-fluoro-1,4-phenylene |
|  | U | 2,6-difluoro-1,4-phenylene |

TABLE 1-continued

Codes for group structures contained in the liquid crystal compound

| Unit structure of the group | Code | Name of the group |
|---|---|---|
|  | I | Indan-2,5-diyl |
| —F | F | Fluoro substituent |
| —O— | O | Oxy substituent |
| —CF$_2$O— | Q | Difluoromethoxy |
| —CH$_2$CH$_2$— | 2 | Ethylene |
| —CH=CH— | V | Vinyl |
| —C$_n$H$_{2n+1}$ or —C$_m$H$_{2m+1}$ | n or m | Alkyl |

Taking a compound having a structural formula below as an example:

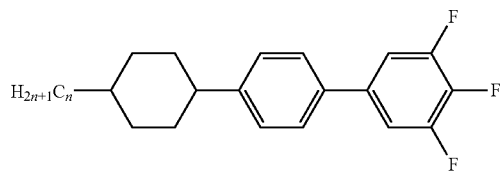

if the structural formula is designated by the codes in Table 1, it may be expressed as nCPUF, where n denotes the number of carbon atoms contained in the alkyl group at the left end, for example, when n is "3", the alkyl group is —C$_3$H$_7$; and C denotes cyclohexylene.

The test items in the following examples are abbreviated as follows:
Cp (° C.): Clearing point (nematic-isotropic phase transition temperature)
Δn: Optical anisotropy (589 nm, 20° C.)
Δε: Dielectric anisotropy (1 KHz, 25° C.)
RT: Response time (ins)
VHR (starting): Voltage holding ratio (%)
VHR (UV): Voltage holding ratio after 20 min sunlight exposure (%)
VHR (150° C.): Voltage holding ratio determined after 1 h degradation at 150° C. (%)
ρ: Resistivity (25° C., *10$^{13}$ Ω·cm)

The optical anisotropy is measured using abbe refractometer under sodium lamp (589 nm) light source at 20° C. The dielectric test cell is the type TN90, and the cell gap is 7 μm.

Δε=ε∥−ε⊥, wherein ε∥ is the dielectric constant parallel to the molecular axis, and ε⊥ is the dielectric constant perpendicular to the molecular axis; the test conditions include 25° C. and 1 KHz; and the test cell is the type TN90, and the cell gap is 7 μm.

The response time is tested by DMS505 at 25° C.; the test cell is the left-handed TN type, the cell gap is 7 μm, and the test voltage is 8 V.

VHR (starting) is tested by TOYO6254 liquid crystal physical property evaluation system, where the test temperature is 60° C., the test voltage is 5V, and the test time is 166.7 ms; VHR (150° C.) is tested by TOYO6254 liquid crystal physical property evaluation system after 1 h degradation of the liquid crystal at 150° C., where the test temperature is 60° C., the test voltage is 5 V, and the test time is 166.7 ms; and VHR (UV) is tested by TOYO6254 liquid crystal physical property evaluation system, where the test temperature is 60° C., the test voltage is 5 V, the test time is 166.7 ms, and the sunlight exposure time is 20 min.

Each of the components used in the following examples can be synthesized by a known method or is commercially available. These synthesis techniques are conventional and the resulting liquid crystal compounds are tested to conform to the standards for electronic compounds.

A liquid crystal composition is prepared according to a mixing ratio of the liquid crystal compounds defined in the following examples. The liquid crystal composition is prepared by a conventional method in the art, for example, mixing according to the defined ratio by heating, ultrasonicating, and suspending, etc.

Comparative Example 1

The liquid crystal composition of Comparative Example 1 was prepared with the compounds in percentages by weight shown in Table 2, and then filled between two substrates of a liquid crystal display for performance test. The test data is shown in a table below.

TABLE 2

Formulation of liquid crystal composition and performances tested

| Code of component | Type of compound | Content, % | Test result of performance parameters | |
|---|---|---|---|---|
| 3CPPC3 | II-10-2 | 4 | Cp | 74.6 |
| 2PGP3 | | 5 | $\Delta n$ | 0.106 |
| 5PGP2 | | 5 | $\Delta \epsilon$ | 5.6 |
| 2PGUF | | 7 | RT | 19.5 |
| 4PGP2 | | 5 | VHR (starting) | 92.4 |
| 3PGUF | | 8 | VHR (150° C.) | 80.5 |
| VCCP1 | II-8-1 | 3 | VHR (UV) | 78.8 |
| 3CCV | II-2-1 | 35 | $\rho$ | 1.2 |
| V2CCP1 | | 10 | | |
| 3CCV1 | II-3-1 | 8 | | |
| 3PUQUF | III-1-2 | 10 | | |
| In total | | 100 | | |

Example 1

The liquid crystal composition of Example 1 was prepared with the compounds in percentages by weight shown in Table 3, and then filled between two substrates of a liquid crystal display for performance test. The test data is shown in a table below.

TABLE 3

Formulation of liquid crystal composition and performances tested

| Code of component | Type of compound | Content, % | Test result of performance parameters | |
|---|---|---|---|---|
| 3CPP2 | II-9-2 | 10 | Cp | 101 |
| 3CPPC3 | II-10-2 | 4 | $\Delta n$ | 0.11 |
| 3CGPC2 | II-11-2 | 4 | $\Delta \epsilon$ | 8.2 |
| 3CCPF | IV-1 | 4 | RT | 16 |
| 3CCUF | IV-5 | 9 | VHR (starting) | 98.7 |
| 3CC2 | II-1-1 | 9 | VHR (150° C.) | 93.1 |
| 2CCQUF | III-6-1 | 5 | VHR (UV) | 90.2 |
| 3CCQUF | III-6-2 | 5 | $\rho$ | 6.8 |
| 3CCV | II-2-1 | 25 | | |
| 3PUQUF | III-1-2 | 5 | | |
| 2PUQUF | III-1-1 | 5 | | |
| 3IGUQUF | III-12-2 | 5 | | |
| 3PGPF | I-2 | 4 | | |

TABLE 3-continued

Formulation of liquid crystal composition and performances tested

| Code of component | Type of compound | Content, % | Test result of performance parameters | |
|---|---|---|---|---|
| 4PGPF | I-3 | 3 | | |
| 5PGPF | I-4 | 3 | | |
| In total | | 100 | | |

Example 2

The liquid crystal composition of Example 2 was prepared with the compounds in percentages by weight shown in Table 4, and then filled between two substrates of a liquid crystal display for performance test. The test data is shown in a table below.

TABLE 4

Formulation of liquid crystal composition and performances tested

| Code of component | Type of compound | Content, % | Test result of performance parameters | |
|---|---|---|---|---|
| 3CCPO3 | II-7-3 | 5 | Cp | 84.2 |
| 3CGPC2 | II-11-2 | 5 | $\Delta n$ | 0.12 |
| 3CPPF | IV-3 | 5 | $\Delta \epsilon$ | 8.9 |
| 5CC2 | II-1-3 | 10 | RT | 15.1 |
| 3CCP1 | II-6-1 | 5 | VHR (starting) | 97.6 |
| 3CCQUF | III-6-2 | 5 | VHR (150° C.) | 92.1 |
| 3PGPC2 | II-12-2 | 5 | VHR (UV) | 91.5 |
| 3CCV | II-2-1 | 30 | $\rho$ | 6.4 |
| 3PUQUF | III-1-2 | 4 | | |
| 2IUQUF | III-11-1 | 4 | | |
| 3IUQUF | III-11-2 | 4 | | |
| 3PGUQUF | III-2-1 | 4 | | |
| 5PGUQUF | III-2-3 | 4 | | |
| 3PGPF | I-2 | 5 | | |
| 4PGPF | I-3 | 5 | | |
| In total | | 100 | | |

Example 3

The liquid crystal composition of Example 3 was prepared with the compounds in percentages by weight shown in Table 5, and then filled between two substrates of a liquid crystal display for performance test. The test data is shown in a table below.

TABLE 5

Formulation of liquid crystal composition and performances tested

| Code of component | Type of compound | Content, % | Test result of performance parameters | |
|---|---|---|---|---|
| 3CP2 | II-4-2 | 8 | Cp | 72.6 |
| 3CGPC2 | II-11-2 | 4 | $\Delta n$ | 0.12 |
| 3CPGF | IV-6 | 10 | $\Delta \epsilon$ | 9.7 |
| 3CPUF | IV-8 | 10 | RT | 15.6 |
| 3CC2 | II-1-1 | 15 | VHR (starting) | 96.5 |
| 5CC2 | II-1-3 | 10 | VHR (150° C.) | 91.3 |
| VCCP1 | II-8-1 | 5 | VHR (UV) | 90.4 |
| C(5)PUQUF | III-3 | 5 | $\rho$ | 5.8 |
| D(5)PUQUF | III-4 | 5 | | |
| 3IUQUF | III-11-2 | 5 | | |
| 3PGUQUF | III-2-1 | 5 | | |
| 5PGUQUF | III-2-3 | 5 | | |
| 3PGPF | I-2 | 5 | | |

TABLE 5-continued

Formulation of liquid crystal composition and performances tested

| Code of component | Type of compound | Content, % | Test result of performance parameters |
|---|---|---|---|
| 4PGPF | I-3 | 4 | |
| 5PGPF | I-4 | 4 | |
| In total | | 100 | |

Example 4

The liquid crystal composition of Example 4 was prepared with the compounds in percentages by weight shown in Table 6, and then filled between two substrates of a liquid crystal display for performance test. The test data is shown in a table below.

TABLE 6

Formulation of liquid crystal composition and performances tested

| Code of component | Type of compound | Content, % | Test result of performance parameters | |
|---|---|---|---|---|
| 3CCV | II-2-1 | 20 | Cp | 95 |
| 5CCV | II-2-3 | 12 | $\Delta n$ | 0.12 |
| 3CPUF | IV-8 | 10 | $\Delta \epsilon$ | 8.5 |
| 3CPP2 | II-9-2 | 4 | RT | 14.9 |
| 3PGPC2 | II-12-2 | 2 | VHR (starting) | 95.4 |
| 3CCUF | IV-5 | 9 | VHR (150° C.) | 91.2 |
| 3CCPO1 | II-7-1 | 9 | VHR (UV) | 89.6 |
| 2ACQUF | III-7-1 | 4 | $\rho$ | 6.1 |
| 3PUQUF | III-1-2 | 4 | | |
| 3DUQUF | III-10-2 | 4 | | |
| 3IUQUF | III-11-2 | 5 | | |
| 3PGUQUF | III-2-1 | 5 | | |
| 3PGPF | I-2 | 4 | | |
| 4PGPF | I-3 | 4 | | |
| 5PGPF | I-4 | 4 | | |
| In total | | 100 | | |

Example 5

The liquid crystal composition of Example 5 was prepared with the compounds in percentages by weight shown in Table 7, and then filled between two substrates of a liquid crystal display for performance test. The test data is shown in a table below.

TABLE 7

Formulation of liquid crystal composition and performances tested

| Code of component | Type of compound | Content, % | Test result of performance parameters | |
|---|---|---|---|---|
| 3CCV | II-2-1 | 20 | Cp | 92 |
| 3CCV1 | II-3-1 | 10 | $\Delta n$ | 0.12 |
| 3CPUF | IV-8 | 10 | $\Delta \epsilon$ | 9.7 |
| 5CPUF | IV-9 | 5 | RT | 15.6 |
| 3CPP2 | II-9-2 | 5 | VHR (starting) | 97.2 |
| 3PGPC2 | II-12-2 | 2 | VHR (150° C.) | 93.9 |
| 3CC2 | II-1-1 | 10 | VHR (UV) | 91.5 |
| 5CC2 | II-1-3 | 8 | $\rho$ | 6.8 |
| 3PUQUF | III-1-2 | 4 | | |
| 3DUQUF | III-10-2 | 4 | | |
| 3IUQUF | III-11-2 | 5 | | |
| 3PGUQUF | III-2-1 | 5 | | |
| 5PGUQUF | III-2-3 | 5 | | |

TABLE 7-continued

Formulation of liquid crystal composition and performances tested

| Code of component | Type of compound | Content, % | Test result of performance parameters |
|---|---|---|---|
| 3PGPF | I-2 | 3 | |
| 4PGPF | I-3 | 4 | |
| In total | | 100 | |

Example 6

The liquid crystal composition of Example 6 was prepared with the compounds in percentages by weight shown in Table 8, and then filled between two substrates of a liquid crystal display for performance test. The test data is shown in a table below.

TABLE 8

Formulation of liquid crystal composition and performances tested

| Code of component | Type of compound | Content, % | Test result of performance parameters | |
|---|---|---|---|---|
| 3CPP2 | II-9-2 | 10 | Cp | 95 |
| 3CPPC3 | II-10-2 | 4 | $\Delta n$ | 0.11 |
| 3CGPC2 | II-11-2 | 4 | $\Delta \epsilon$ | 8.6 |
| 3CCPF | IV-1 | 4 | RT | 16 |
| 3CCUF | IV-5 | 9 | VHR (starting) | 96.7 |
| 3CC2 | II-1-1 | 9 | VHR (150° C.) | 93.1 |
| C(5)CCQUF | III-5 | 5 | VHR (UV) | 91.2 |
| 3DCQUF | III-8-2 | 5 | $\rho$ | 5.8 |
| 3CCV | II-2-1 | 25 | | |
| 2AUQUF | III-9-1 | 5 | | |
| 2ACQUF | III-7-1 | 5 | | |
| 3IGUQUF | III-12-2 | 5 | | |
| 3PGPF | I-2 | 4 | | |
| 4PGPF | I-3 | 3 | | |
| 5PGPF | I-4 | 3 | | |
| In total | | 100 | | |

As can be known from the data obtained in examples above, the liquid crystal composition provided in the present invention has the properties of large optical and dielectric anisotropies, fast response speed, high resistivity, good high-temperature stability, and UV stability, and is applicable to a liquid crystal display. Compared with Comparative Example 1, the liquid crystal composition provided in the present invention has larger optical and dielectric anisotropies, shorter response time, higher resistivity, and better high-temperature and UV stability, and can meet the requirement of high response speed for an LCD display, such that a good display effect of images without ghosting can be achieved when the liquid crystal display works in a harsh environment. Therefore, significant technical advancements are achieved.

The above embodiments are merely illustrative of the technical concepts and features of the present invention, and provided for facilitating the understanding and practice of the present invention by those skilled in the art. However, the protection scope of the invention is not limited thereto. Equivalent variations or modifications made without departing from the spirit and essence of the present invention are intended to be contemplated within the protection scope of the present invention.

What is claimed is:

1. A liquid crystal composition, comprising:
one or more compounds of general Formula I:

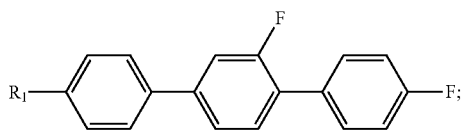

one or more compounds of general Formula II:

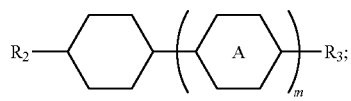

and
one or more compounds of general Formula III:

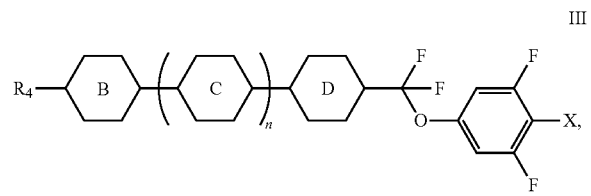

wherein:

$R_1$, $R_2$, $R_3$ and $R_4$ are the same or different, and each independently denotes H, a linear alkyl or alkoxy group having 1 to 7 carbon atoms, or an alkenyl group having 2 to 7 carbon atoms;

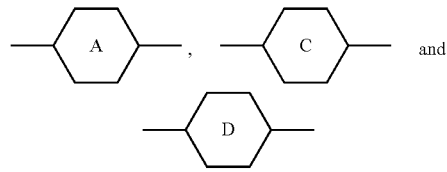

are the same or different, and each independently denotes

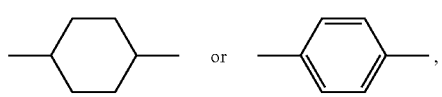

wherein one or more H atoms on the

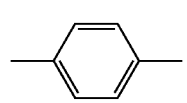

may be replaced by F;

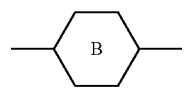

denotes

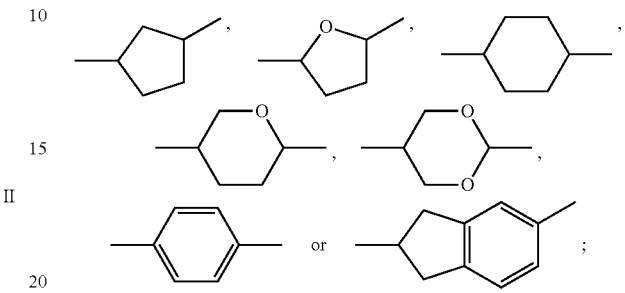

X denotes F or —OCF$_2$CF=CF$_2$;
m denotes 1, 2 or 3; and
n denotes 0 or 1.

2. The liquid crystal composition according to claim 1, wherein the compound of general Formula I accounts for 5-30% of the total weight of the liquid crystal composition; the compound of general Formula II accounts for 30-70% of the total weight of the liquid crystal composition; and the compound of general Formula III accounts for 15-40% of the total weight of the liquid crystal composition.

3. The liquid crystal composition according to claim 1, wherein the liquid crystal composition further comprising:
one or more compounds of general Formula IV that account for 1-30% of the liquid crystal composition:

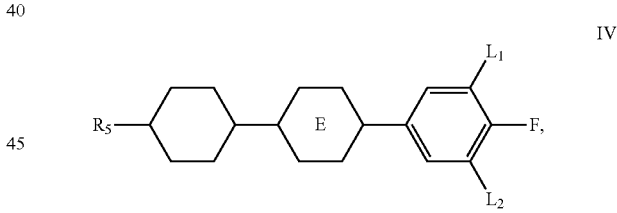

wherein:

$R_5$ denotes a linear alkyl or alkoxy group having 1 to 7 carbon atoms;

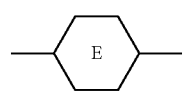

denotes

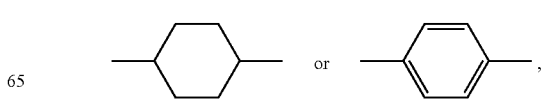

wherein one or more H atoms on the

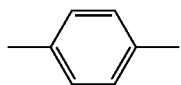

may be replaced by F; and

L$_1$ and L$_2$ are the same or different, and each independently denotes H or F.

4. The liquid crystal composition according to claim 1, wherein the compound of general Formula I is one or more selected from the group consisting of:

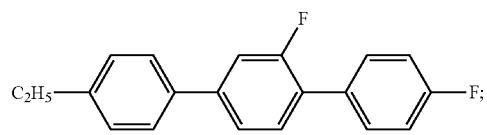

I-1

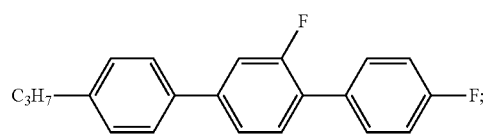

I-2

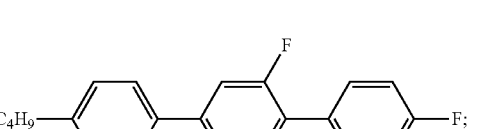

I-3

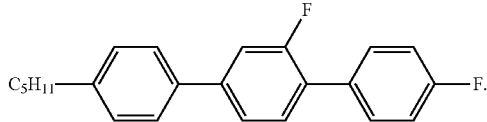

and

I-4

5. The liquid crystal composition according to claim 1, wherein the compound of general Formula II is one or more selected from the group consisting of:

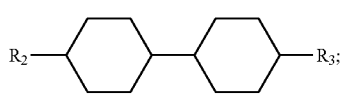

II-1

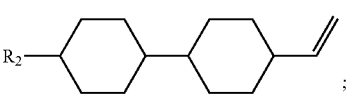

II-2

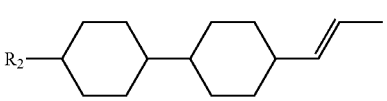

II-3

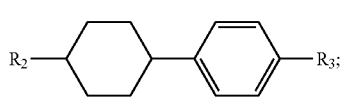

II-4

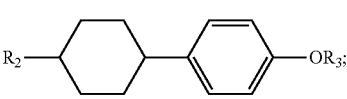

II-5

II-6

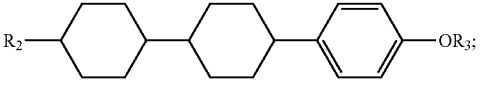

II-7

II-8

II-9

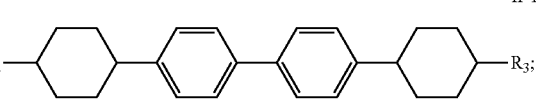

II-10

II-11 and

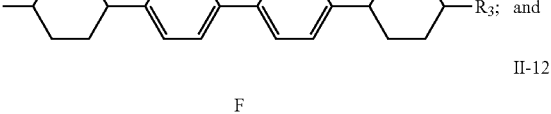

II-12 wherein:

R$_2$ and R$_3$ are the same or different, and each independently denotes a linear alkyl group having 1 to 5 carbon atoms.

6. The liquid crystal composition according to claim 1, wherein the compound of general Formula III is one or more selected from the group consisting of:

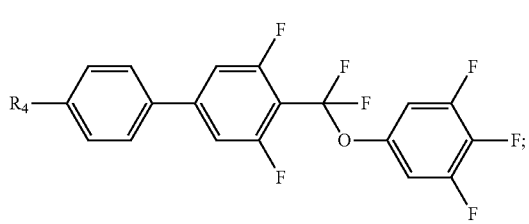

III-1

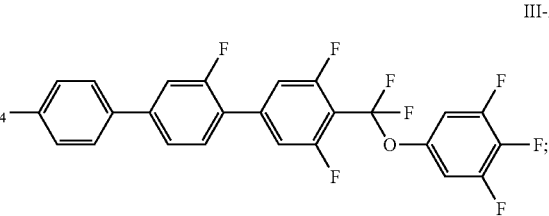

III-2

III-3
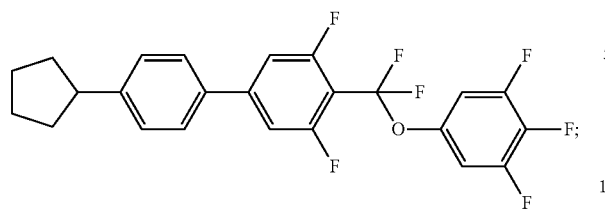
III-4
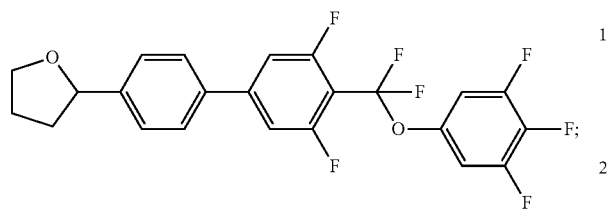
III-5
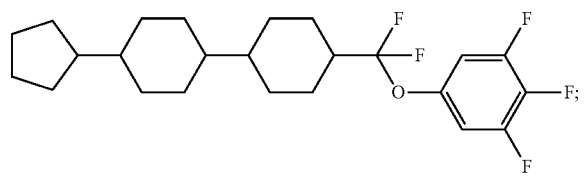
III-6
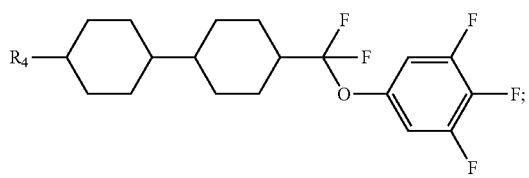
III-7
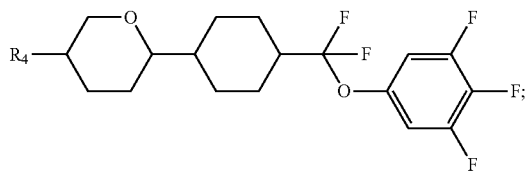
III-8
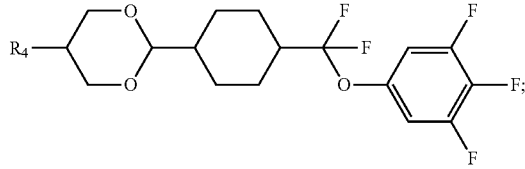
III-9
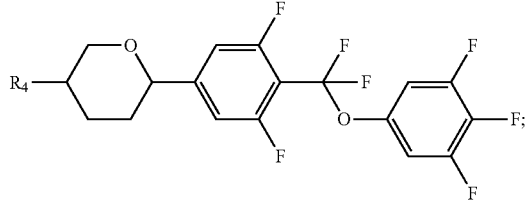
III-10
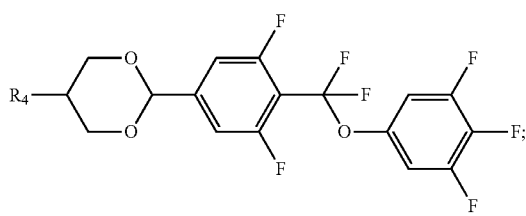
III-11
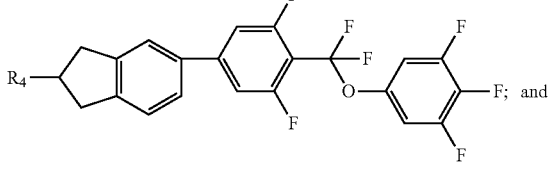
III-12
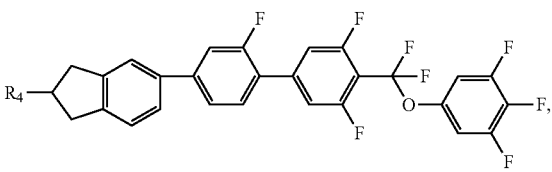
wherein:
$R_4$ denotes a linear alkyl group having 1 to 5 carbon atoms.
7. The liquid crystal composition according to claim 5, wherein the compound of general Formula II-1 is one or more selected from the group consisting of:
II-1-1
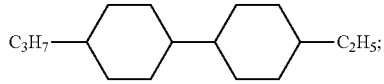
II-1-2
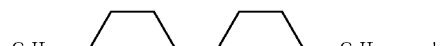
II-1-3
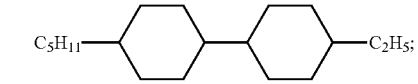
the compound of general Formula II-2 is one or more selected from the group consisting of:
II-2-1
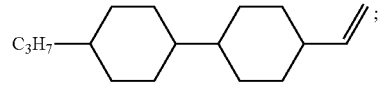
II-2-2
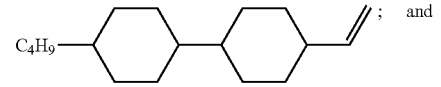

-continued

II-2-3
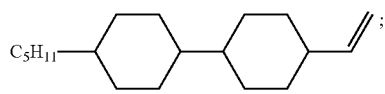

the compound of general Formula II-3 is one or more selected from the group consisting of:

II-3-1
II-3-2
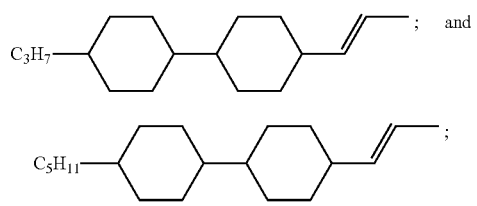

the compound of general Formula II-4 is one or more selected from the group consisting of:

II-4-1
II-4-2
II-4-3
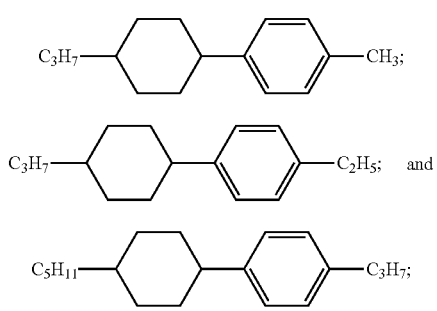

the compound of general Formula II-5 is one or more selected from the group consisting of:

II-5-1
II-5-2
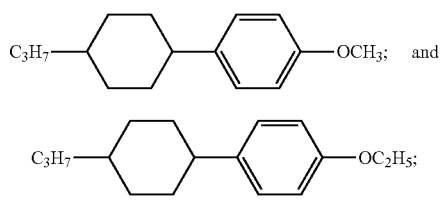

the compound of general Formula II-6 is one or more selected from the group consisting of:

II-6-1
II-6-2
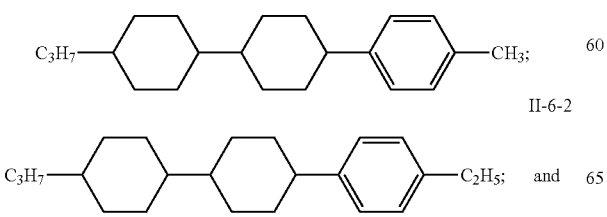

II-6-3

the compound of general Formula II-7 is one or more selected from the group consisting of:

II-7-1

II-7-2

II-7-3
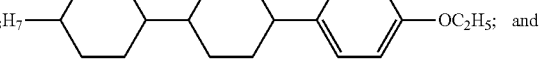

the compound of general Formula II-8 is one or more selected from the group consisting of:

II-8-1
II-8-2
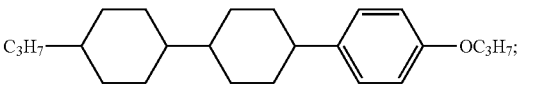

the compound of general Formula II-9 is one or more selected from the group consisting of:

II-9-1
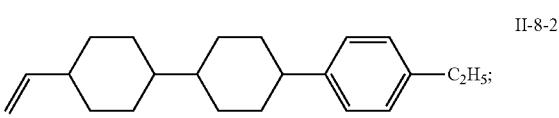

II-9-2
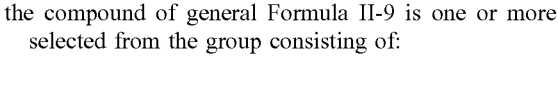

II-9-3
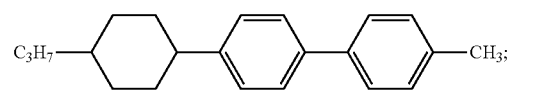

the compound of general Formula II-10 is one or more selected from the group consisting of:

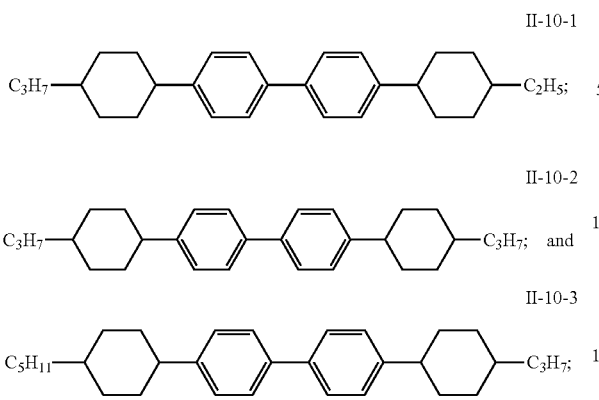

the compound of general Formula II-11 is one or more selected from the group consisting of:

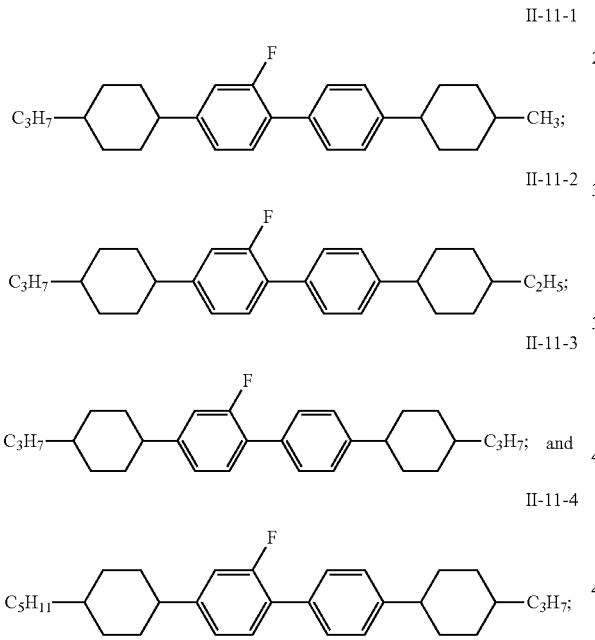

and the compound of general Formula II-12 is one or more selected from the group consisting of:

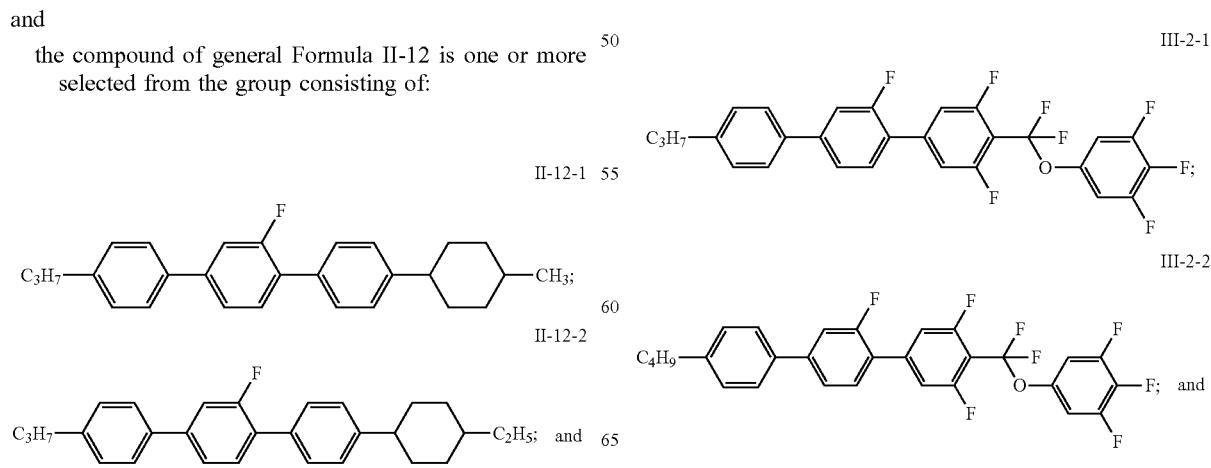

8. The liquid crystal composition according to claim 6, wherein the compound of general Formula III-1 is one or more selected from the group consisting of:

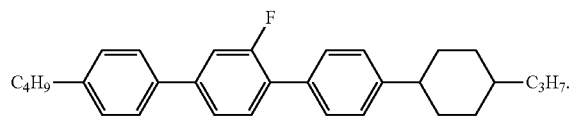

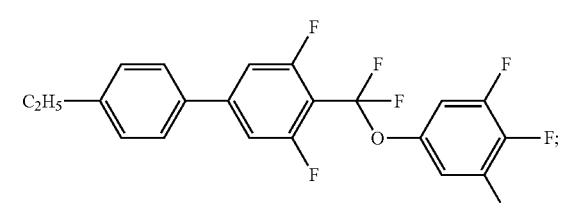

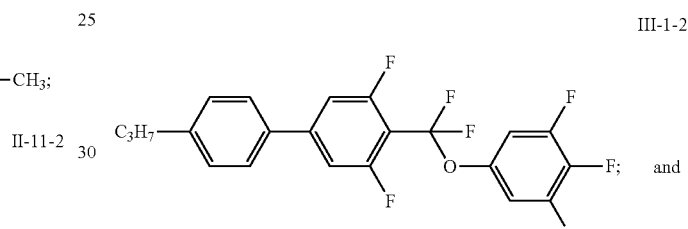

the compound of general Formula III-2 is one or more selected from the group consisting of:

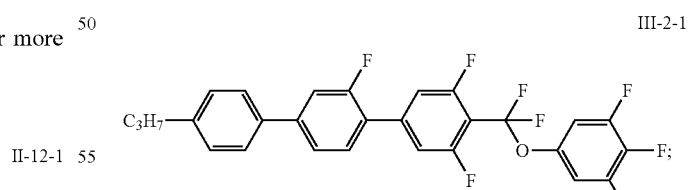

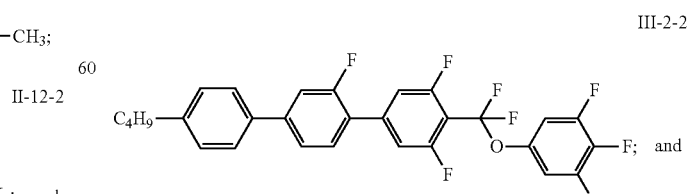

III-3-3

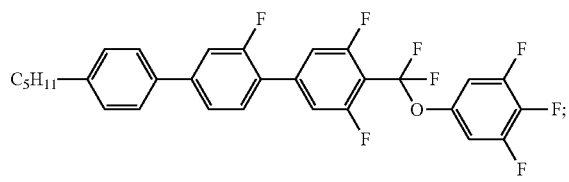

the compound of general Formula III-6 is one or more selected from the group consisting of:

III-6-1

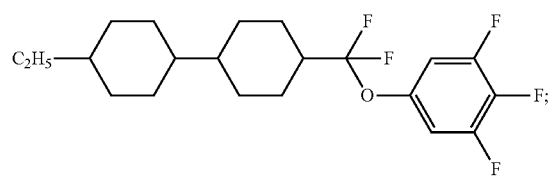

III-6-2

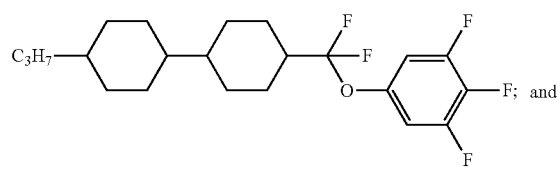

III-6-3

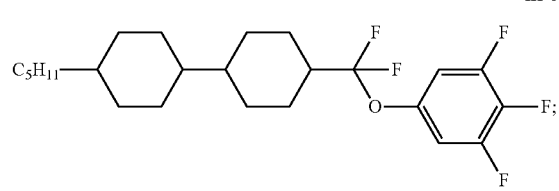

the compound of general Formula III-7 is one or more selected from the group consisting of:

III-7-1

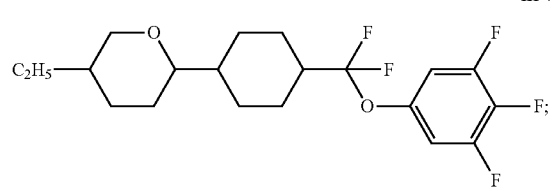

III-7-2

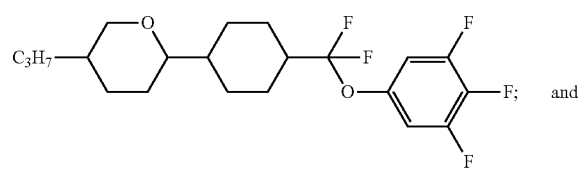

III-7-3

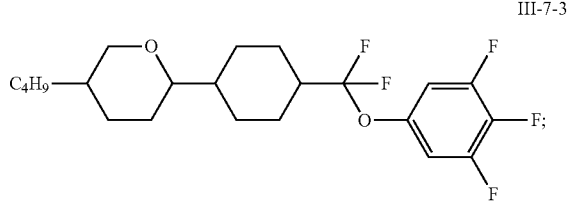

the compound of general Formula III-8 is one or more selected from the group consisting of:

III-8-1

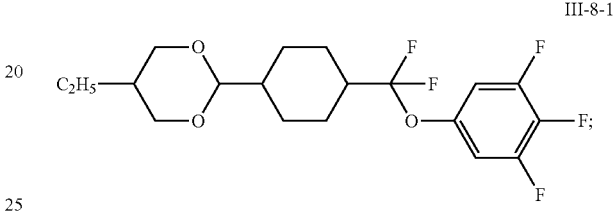

III-8-2

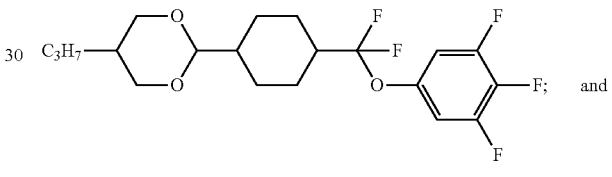

III-8-3

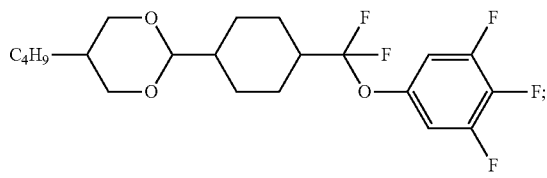

the compound of general Formula III-9 is one or more selected from the group consisting of:

III-9-1

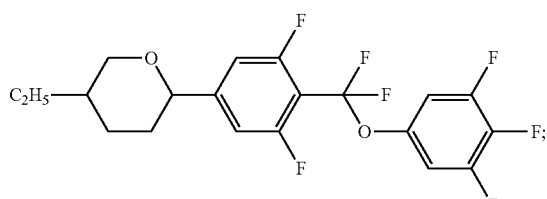

III-9-2

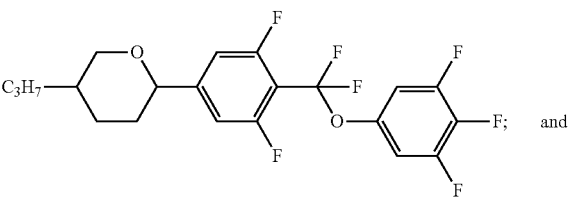

III-9-3
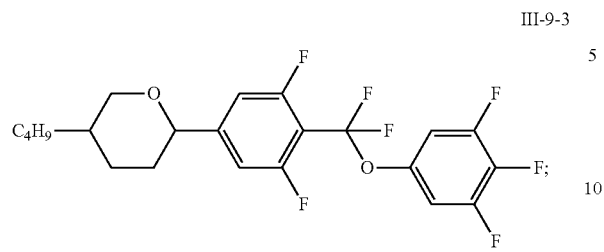
the compound of general Formula III-10 is one or more selected from the group consisting of:
the compound of general Formula III-11 is one or more selected from the group consisting of:
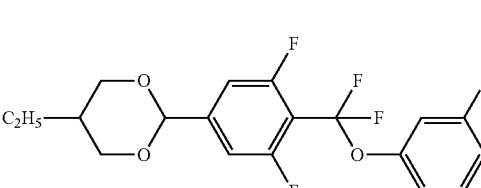
and
the compound of general Formula III-12 is one or more selected from the group consisting of:

9. The liquid crystal composition according to claim 3, wherein the compound of general Formula IV is one or more selected from the group consisting of:

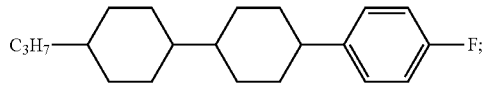
IV-1

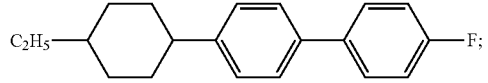
IV-2

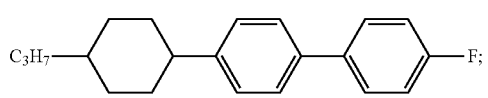
IV-3

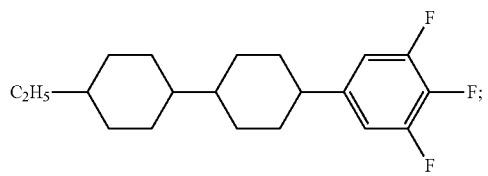
IV-4

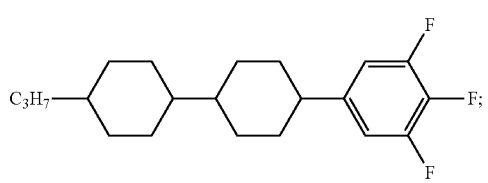
IV-5

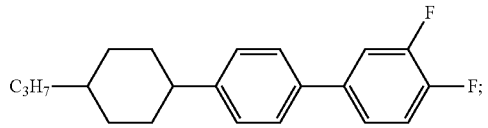
IV-6

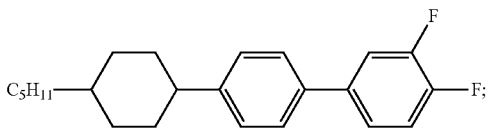
IV-7

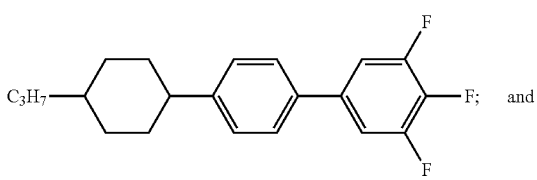
IV-8 and

IV-9

10. The liquid crystal composition according to claim 3, wherein the compound of general Formula I accounts for 5-15% of the total weight of the liquid crystal composition; the compound of general Formula II accounts for 40-60% of the total weight of the liquid crystal composition; the compound of general Formula III accounts for 20-25% of the total weight of the liquid crystal composition; and the compound of general Formula IV accounts for 5-20% of the total weight of the liquid crystal composition.

11. A liquid crystal display (LCD), wherein it comprises the liquid crystal composition according to claim 1.

* * * * *